(12) United States Patent
Audenaert et al.

(10) Patent No.: US 6,301,935 B1
(45) Date of Patent: Oct. 16, 2001

(54) PROCESS FOR THE MANUFACTURE OF MILLED GLASS FIBERS

(75) Inventors: Raymond Audenaert, Hamme (BE); Alban Hennen, Leverkusen (DE); Josef Schmoll, Wermelskirchen (DE); Heinz Goller, Odenthal-Osenau (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/268,687

(22) Filed: Jun. 30, 1994

Related U.S. Application Data

(63) Continuation-in-part of application No. 08/034,032, filed on Mar. 22, 1993, now abandoned.

(30) Foreign Application Priority Data

Mar. 31, 1992 (DE) ................................................ 42 10 500

(51) Int. Cl.[7] .................................................. C03B 37/16
(52) U.S. Cl. ............................... 65/442; 65/21.1; 65/215; 241/4; 241/23; 241/17
(58) Field of Search ........................... 65/480, 376, 442, 65/452, 21.1, 21.5; 241/23, 16, 17, 4

(56) References Cited

U.S. PATENT DOCUMENTS

| | | | |
|---|---|---|---|
| 3,766,003 | * 10/1973 | Schuller | 65/480 |
| 3,869,268 | * 3/1975 | Briar | 65/452 |
| 3,962,172 | * 6/1976 | Wurmb | 260/37 N |
| 4,039,718 | * 8/1977 | Kallenborn | 65/452 |
| 4,145,202 | 3/1979 | Grodin et al. . | |
| 5,007,947 | * 4/1991 | Kenmoti | 65/480 |
| 5,087,518 | * 2/1992 | Shimada | 65/21.1 |
| 5,417,889 | * 5/1995 | Akiba | 241/4 |

FOREIGN PATENT DOCUMENTS

| | | | |
|---|---|---|---|
| 0334171 | 9/1989 | (EP) . | |
| 2578833 | 9/1986 | (FR) . | |
| 0668700 | * 6/1979 | (SU) | 241/4 |

OTHER PUBLICATIONS

Patent Abstracts of Japan, vol. 7, No. 185 (C181), one page; JP58088137, Feb. 26, 1983; Nitto Boseki KK, "Preparation of Glass Powder".

* cited by examiner

*Primary Examiner*—John Hoffmann
(74) *Attorney, Agent, or Firm*—Norris McLaughlin & Marcus

(57) ABSTRACT

New glass fibers having an average length of about 100 to 400 $\mu$m and an apparent density of about 1 to 0.2 g/cm$^3$ are produced by spinning glass fibers, comprising spinning glass fibers into bundles, cooling with liquid to form wet bundles, directly cutting such bundles in the wet state, without previous drying, grinding said bundles to milled glass fibers in a high-efficiency mixer with the addition of a liquid, and then drying. The fibers are especially suited for filling polyurethanes by the PUR-RIM process.

4 Claims, 2 Drawing Sheets

Schematic Drawing of the Process

PROCESS FOR THE MANUFACTURE OF MILLED GLASS FIBERS

This application is a continuation-in-part of application Ser. No. 08/034,032, filed on Mar. 22, 1993, now abandoned.

The present invention relates to milled glass fibers and to a simplified process for the manufacture of these milled glass fibers.

BACKGROUND OF THE INVENTION

Glass fibers have hitherto been processed to sized or unsized cakes in the spinning and winding process. These cakes, which have a moisture content of approximately 12% by weight, are then dried in a forced-air oven, precomminuted with guillotine shears and subsequently ground to so-called milled fibers in cross hammer mills.

The disadvantage of this process carried out hitherto is that, after the glas fibers bundle has been cooled and, if appropriate, coated with a size, it is first wound on to a cardboard tube in order then to be dried as so-called wet cake, which has been taken off the winding spindle. After drying, the cardboard tube is removed from the cake by hand and the cake is then extended to form a loose bed and fed to guillotine shears for precomminution. The precomminuted product is then passed into a hammer mill, where it is ground into milled glass fibers.

The milled glass fibers manufactured in this way have the disadvantage of a low apparent density coupled with correspondingly small average lengths.

The object is therefore to provide improved milled glass fibers and an improved and simplified process for the manufacture of these milled glass fibers without the quality of the milled glass fibers being adversely affected.

This object could be achieved by the glass fibers according to the invention and the process according to the invention.

SUMMARY OF THE INVENTION

The invention relates to milled glass fibers which are characterized in that they have an average length of 100 to 400 $\mu$m and at the same time an apparent density of 1 to 0.2 g/cm$^3$.

The milled glass fibers have an average length preferably of 150 to 300 $\mu$m, most preferably 180 to 250 $\mu$m, and at the same time an apparent density of 0.8 to 0.3 g/cm$^3$, most preferably 0.6 to 0.4 g/cm$^3$.

The milled glass fibers according to the invention are distinguished by high apparent densities coupled with correspondingly large average lengths.

In general, the diameters of the glass fibers are between 8 and 24 $\mu$m, preferably between 10 and 14 $\mu$m.

The physical characteristics of the glass fibers were determined by the following procedures:

The apparent density of the glass fibers is defined as the amount, in grams, which occupies 1 cm$^3$ after loose pouring into a vessel, The vessel (250 ml measuring cylinder) is first weighed empty. It is then filled loosely with glass fibers until a volume of 250 ml is reached. The filled measuring cylinder is reweighed. The procedure is repeated several times and the values are averaged. The error in the apparent density data is ±0.02 g/cm$^3$.

To determine the fiber length, 1–2 drops of a water/glycerol mixture (1:1) are placed on each of 3 microscope slides. Approximately 20 mg of fibers are then added carefully, finely divided. Under the microscope, the fibers in the corresponding field of vision are then counted and measured; the field should not contain more than 250 fibers if perfect counting and measurement of the fibers is to be guaranteed. The average fiber length is determined by measuring at least 600 fibers. The error in the fiber length determination is 5%.

The invention further relates to a process for the manufacture of the milled glass fibers according to the invention, which is characterized in that, after cooling and, if appropriate, after sizing, the glass fibers obtained at the spinning stage are cut directly, without previous drying, and are then ground to milled glass fibers in a high-efficiency mixer, with the addition of liquids, especially water, and/or sizing agents if appropriate, and then dried if appropriate.

The liquid or water and/or, if appropriate, size are preferably added in amounts such that at least 10% and at most 40%, preferably at least 22% and at most 28%, of water is present based on the total amount in the mixer.

Prior to grinding, the glass fiber bundles are preferably cut to an average length of 3 to 55 mm.

In a preferred embodiment of the process, the cut glass fiber bundles are ground in a solid mixer with a Froude number Fr of $$Fr = \frac{R \cdot w^2}{g} \gg 1$$

where R=radius of the mixing elements in the mixer w=angular velocity of the mixing elements g=gravitational acceleration.

In the process according to the invention, the sized or unsized glass fibers are processed directly at the spinning stage to so-called chopped strands and then, whithout previous drying, are ground to milled fiber in a high-efficiency mixer, with the addition of, e.g., water.

Chopped strands, which are produced in conventional manner via an intermediate so-called cake, can also be ground to milled fibers by the novel process.

The moist ground material (water content up to approximately 30% by weight) is then dried in a drying step. Examples of drying units which can be used are forced-air ovens, HF ovens, band dryers and vibrating conveyor dryers.

Milled fiber products with different average fiber lengths can be manufactured by varying the grinding times and the amount of products and water.

Conventionally, the sizes which may be used consist of film-forming agents (e.g. based on polyurethane, epoxy resin, polyvinyl acetate or mixtures thereof), coupling agents (e.g. organofunctional silanes), lubricants (e.g. polyethylene glycol, polypropylene glycol or quaternary fatty acid amides) and, if appropriate, antistatic agents (e.g. lithium chloride, ammonium chloride or sodium hydrogen phosphate).

These milled fiber products according to the invention differ from the products manufactured by the former process especially in that the apparent densities achieved can be twice as high for comparable average fiber lengths (Table 1). Thus it is also possible to manufacture milled fiber products with an average fibre length of 0.3 mm, which can even be processed in the PUR-RIM process (Poly-urethane-Reinfoiced Reaction Injection Molding Process).

BRIEF DESCRIPTION OF THE DRAWINGS

The invention will be further described with reference to the accompanying drawing in which.

Furthermore, due to the low mixing viscosities, higher glass contents can be attained with the milled fiber products according to the invention than with the known milled fiber products.

A further advantage of the process according to the invention is that additional sizing operations can be carried out in the high-efficiency mixer. It is possible to add, for example, coupling agents, film-forming agents, lubricants and antistatic agents as aqueous dispersions or else as solutions in organic solvents.

The milled glass fibers according to the invention are preferably used in thermoplastics and thermoset plastics, espoically in polyurethanes.

Figure 1:
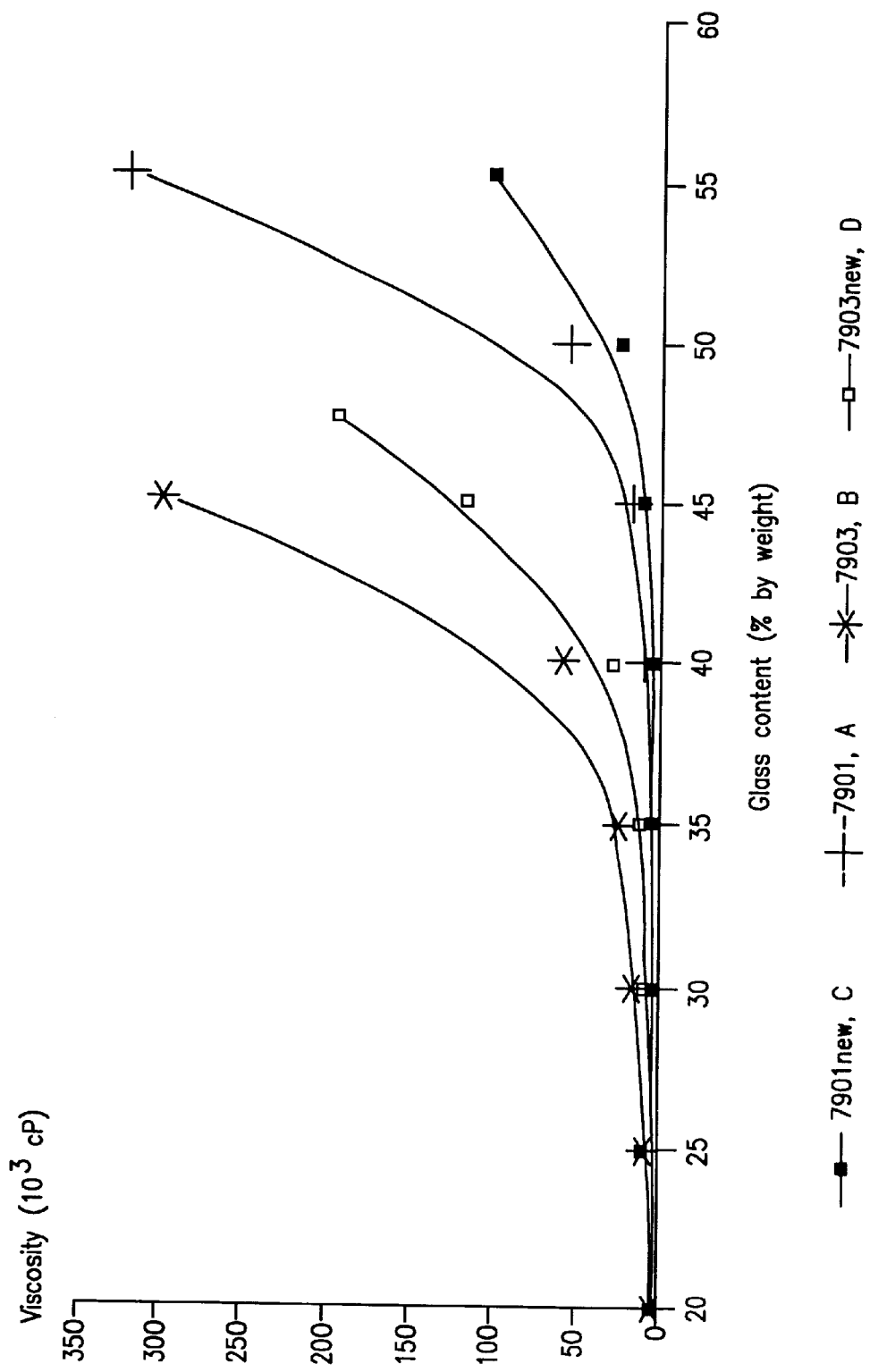
FIG. 1 shows the thickening curves of known milled fibers (MF 7901 (A) and MF 7903 (B), commercial products from BAYER AG) and the milled fibers according to the invention ("7901 New" (C) and "7903 New" (D), equal fiber length as the standard products MF 7901 and MF 7903), in each case in polyol with increasing glass contents. The mixing viscosities of the milled fibers according to the invention in polyol are markedly lower than those of the known milled fibers for comparable glass contents. Due to their poor dispersibility in polyol, many of the known milled fibers have not previously been used by PUR-RIM processors. The milled fibers according to the invention, on the other hand, can all be used in the PUR-RIM process.
Figure 2:
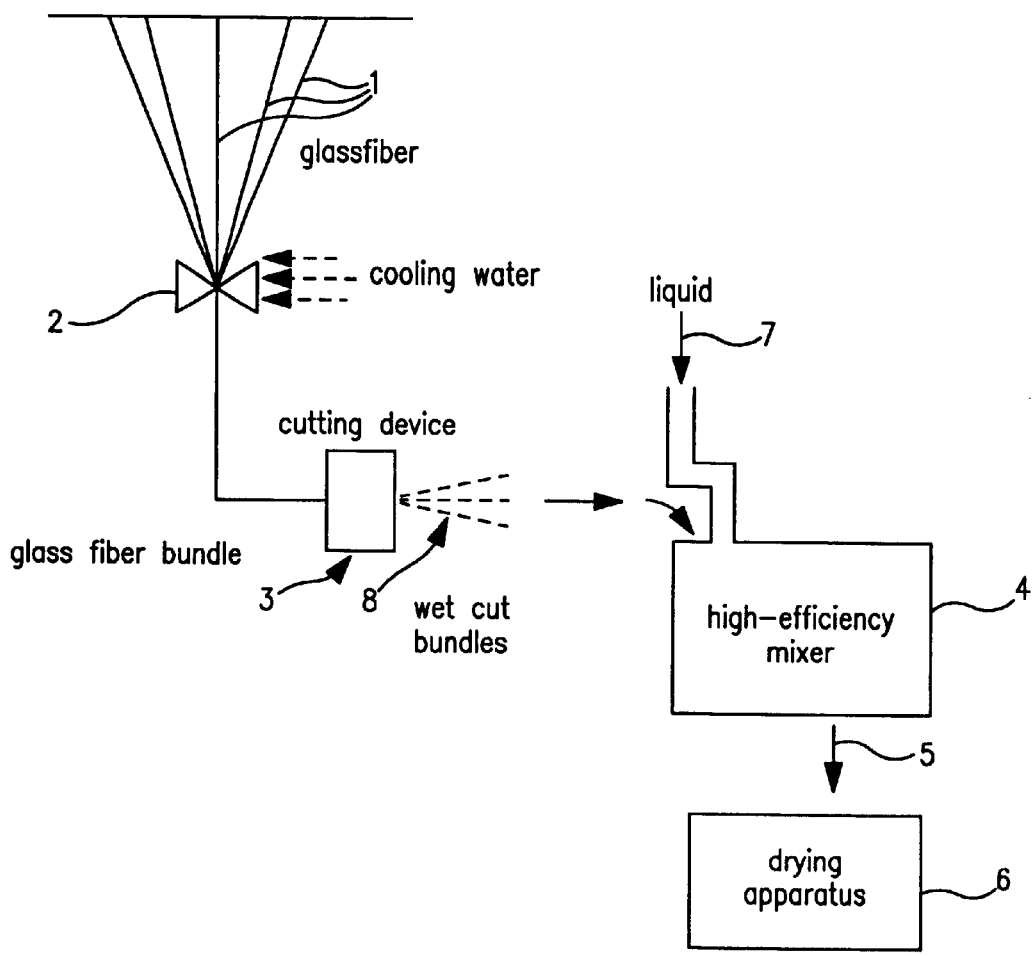

FIG. 2 is a schematic Drawing of the process according to the present invention.

As shown in FIG. 2, the glass fibers 1 after cooling 2, pass directly to a cutting device 3, without previous drying. After passing through the cutting device, the cut glass fibers 8 are passed into a high-efficiency mixer 4, to which a liquid 7 is also added. After being ground in the high-efficiency mixer, the ground glass fibers 5 are passed to a drying apparatus 6.

The invention will be illustrated in greater detail in the following example.

EXAMPLE

After cooling with water to approximately 30° C., the glass fiber bundles obtained at the spinning stage are cut to a length of 4.5 mm with a so-called chopper.

30 kg of these 4.5 mm chopped strands are placed in a high-efficiency mixer (75 l capacity). The water content of these glass fibers is approximately 15% by weight. After the addition of a further 4 l of $H_2O$, the mixer is started. The speed of rotation of the stirrer, which is equipped with a dissolver disc, is 3000 rpm in clockwise direction. The container rotates slowly in counterclockwise direction.

After 180 seconds, the chopped strands have been ground to a milled fiber product with an average length of 240 µm.

After 210 seconds, milled glass fibers with an average length of 180 µm have been obtained.

The ground material front the mixer is then dried.

TABLE 1

| MILLED FIBER PRODUCTS | APPARENT DENSITY [g/cm³] |
| --- | --- |
| A (7901) | 0.28 |
| B (7903) | 0.15 |
| C (7901 New) | 0.60 |
| D (7903 New) | 0.35 |

A - known product - milled E-glass fibers with an average length of 180 µm and a diameter of 14 µm
B - known product - milled E-glass fibers with an average length of 240 µm and a diameter of 14 µm.
C - product according to the invention - milled E-glass fibers with an average length of 180 µm and a diameter of 14 µm
D - product according to the invention - milled E-glass fibers with an average length of 240 µm and a diameter of 14 µm.

It will be understood that the specification and examples are illustrative but not limitative of the present invention and that other embodiments within the spirit and scope of the invention will suggest themselves to those skilled in the art.

What is claimed is:

1. A process for the manufacture of milled glass fibers having an average length of about 100 to 400 µm, an apparent density of about 1 to 0.2 g/cm³ and a diameter of 10 to 14 µm comprising spinning glass fibers into bundles, cooling said bundles with water to form wet bundles, directly cutting such wet bundles, without previous drying, grinding said cut wet bundles to milled glass fibers in a solid mixer with a Froude number Fr of $$Fr = \frac{RW^2}{g} \gg 1$$

where R=radius of the mixing elements in the mixer,

W=angular velocity of the mixing elements, and g=gravitational acceleration with the addition of a liquid, and then drying to get the milled glass fibers.

2. A process according to claim 1, wherein the liquid is added to the mixer in an amount such that about 10% to 40% of liquid is present, based on the total weight of liquid and cut bundles in the mixer.

3. A process according to claim 1, wherein the liquid is added to the mixer in an amount such that about 22% to 28% of liquid is present, based on the total weight of liquid and cut bundles in the mixer.

4. A process according to claim 1, wherein prior to grinding in the mixer, the glass fiber bundles are directly cut to an average length of about 3 to 55 mm.

* * * * *